J. C. BECKFIELD.
WATER HEATER.
APPLICATION FILED DEC. 14, 1910.

1,164,061.

Patented Dec. 14, 1915.
5 SHEETS—SHEET 1.

J. C. BECKFIELD.
WATER HEATER.
APPLICATION FILED DEC. 14, 1910.

1,164,061.

Patented Dec. 14, 1915.
5 SHEETS—SHEET 4.

J. C. BECKFIELD.
WATER HEATER.
APPLICATION FILED DEC. 14, 1910.
1,164,061.
Patented Dec. 14, 1915.
5 SHEETS—SHEET 5.
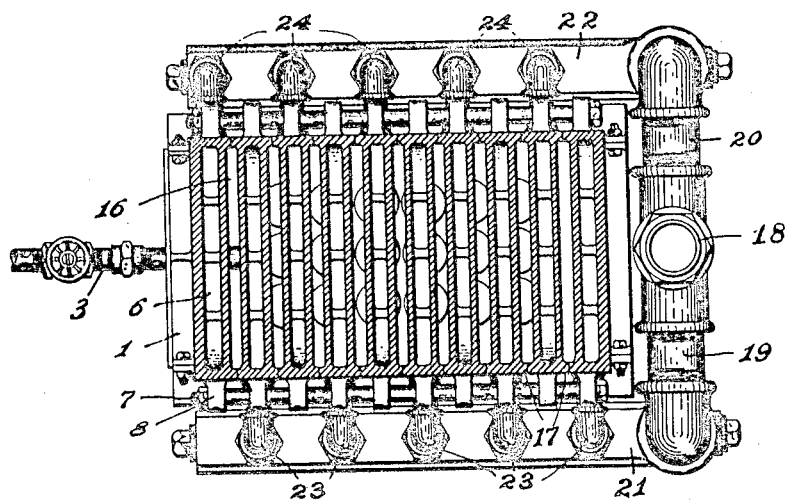
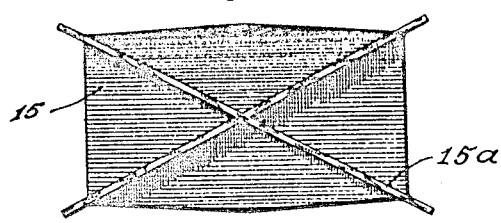
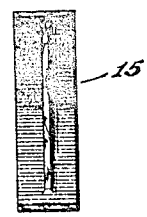

UNITED STATES PATENT OFFICE.

JOHN C. BECKFIELD, OF PITTSBURGH, PENNSYLVANIA.

WATER-HEATER.

1,164,061.  Specification of Letters Patent.  Patented Dec. 14, 1915.

Application filed December 14, 1910. Serial No. 597,226.

*To all whom it may concern:*

Be it known that I, JOHN C. BECKFIELD, a citizen of the United States residing at Pittsburgh, in the county of Allegheny and State of Pennsylvania, have invented a new and useful Improvement in Water-Heaters, of which improvement the following is a specification.

My invention relates to water heaters.

The object of my invention is to produce a heater in which the circulating water is heated to the highest possible degree in a minimum period of time, and in which the heated water has a maximum rapidity of circulation.

In addition to this broad general idea I aim to produce a heater comprising a plurality of very narrow water chambers having narrow flues therebetween for the exit of products of combustion.

The construction of said heater is such that while it is simple and efficient as a heater it is capable of being assembled readily and quickly.

I accomplish these several objects by means of the devices hereinafter set forth, reference being had to the accompanying drawings, forming part hereof, in which—

Figure 1:
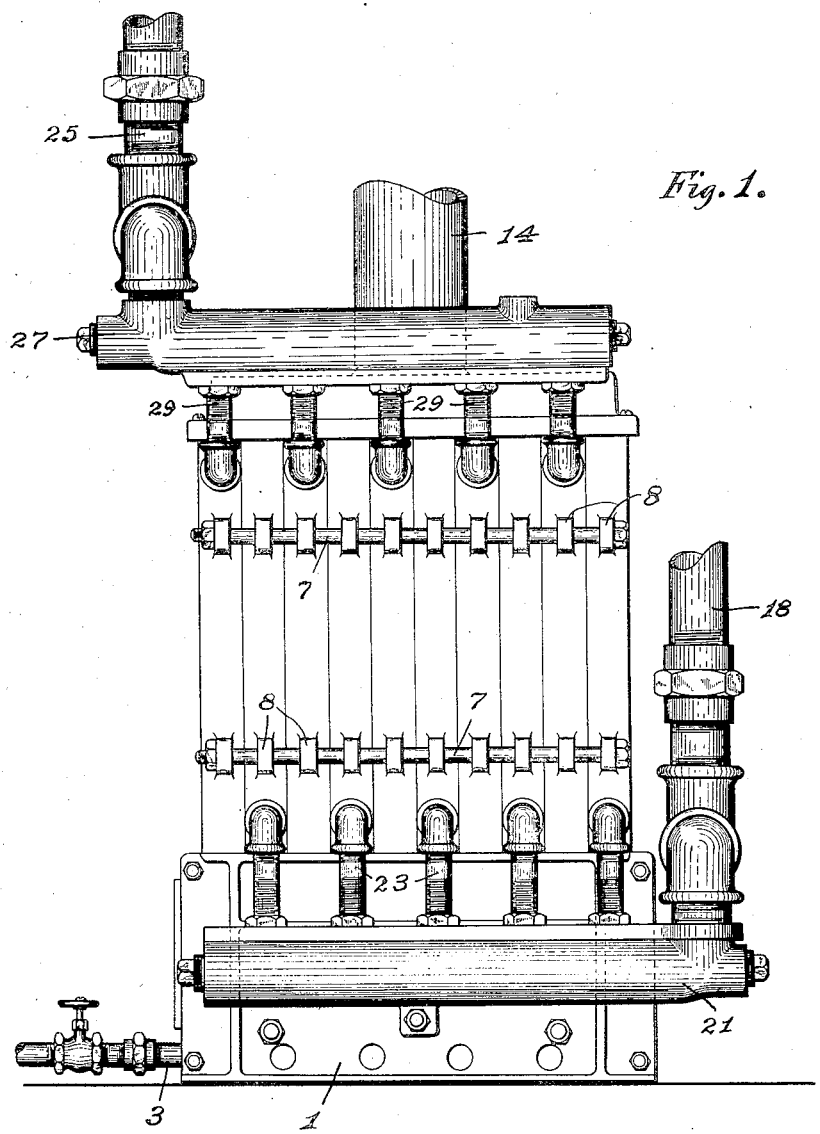
Figure 2:
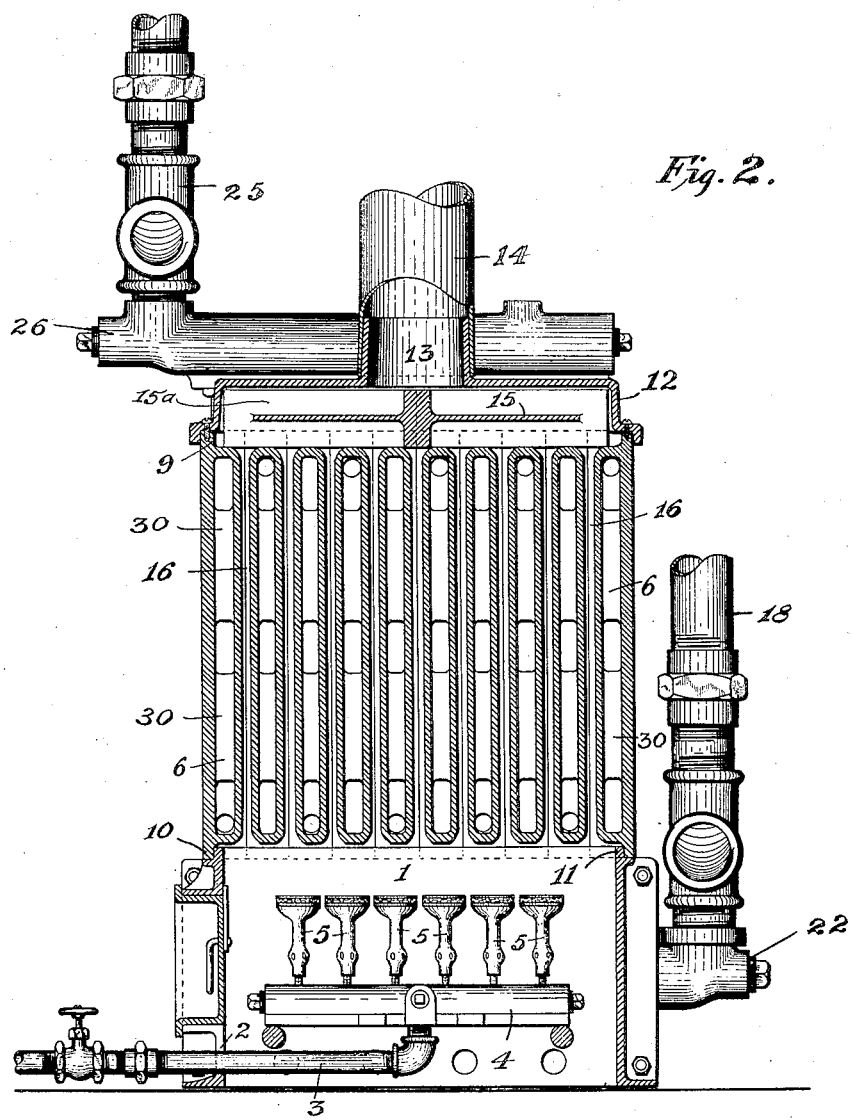
Figure 3:
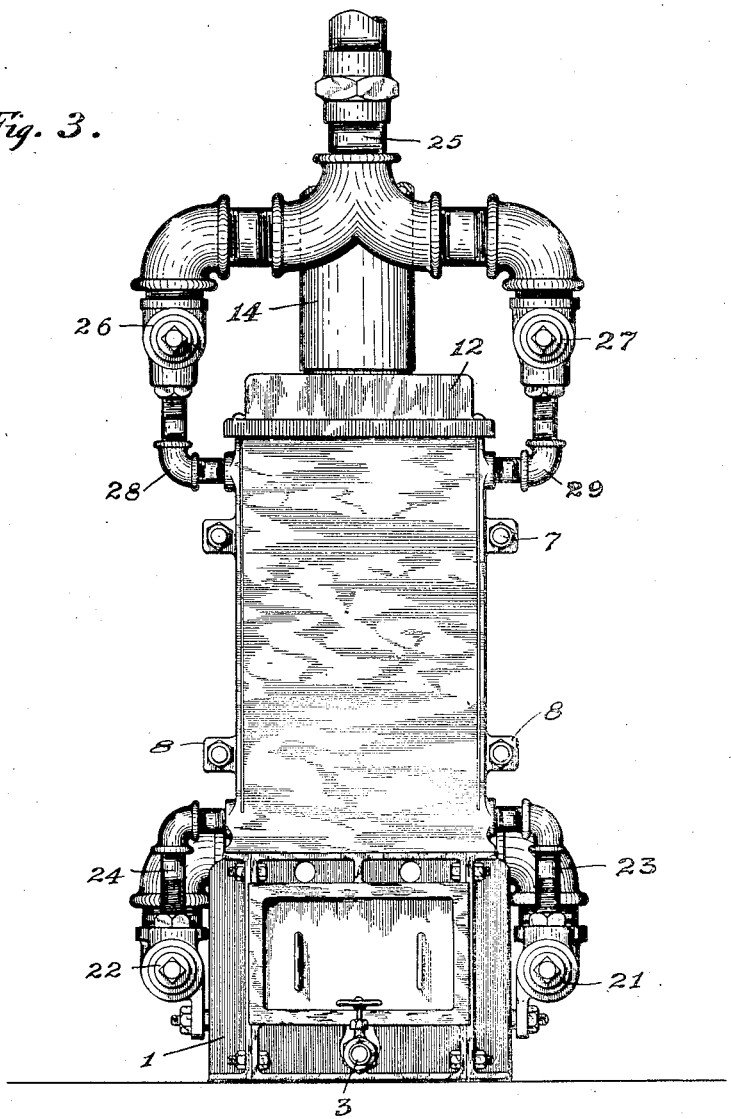
Figure 4:
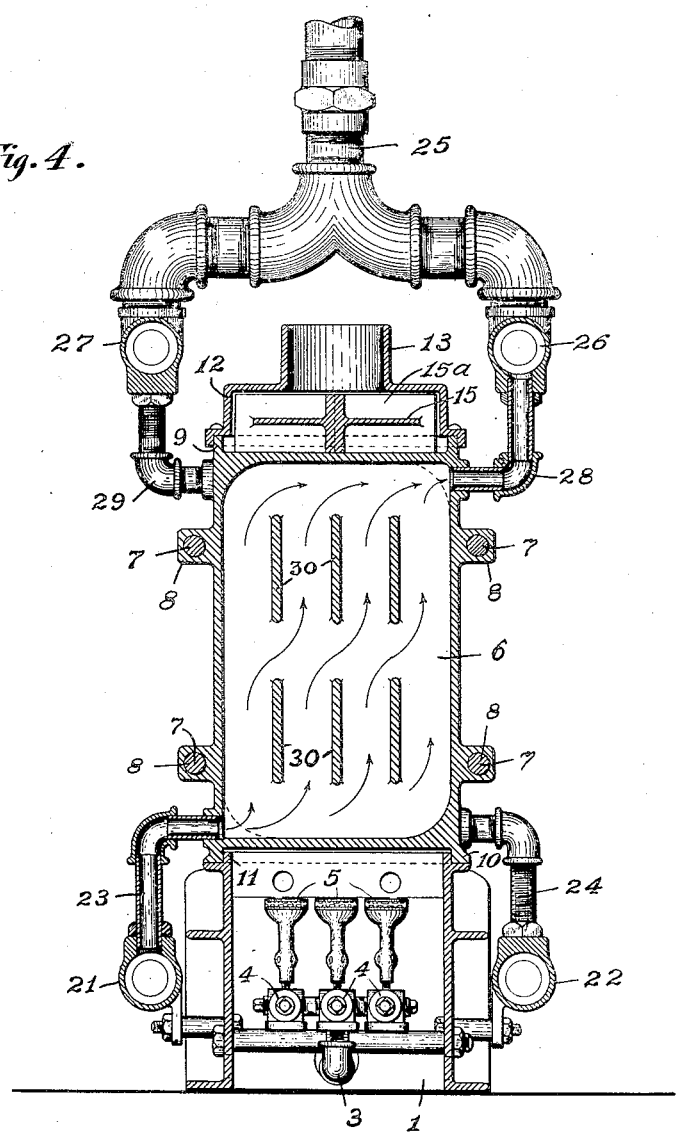

Figure 1 is a side elevator of my improved heater. Fig. 2 is a vertically central section of the same. Fig. 3 is an end view of the same. Fig. 4 is a transverse vertical section of the same. Fig. 5 is a horizontal transverse section of the same. Fig. 6 is an inverted plan view of the draft distributer. Fig. 7 is an end view of the same.

Referring to said drawings, 1 is a fire box which is formed of cast plates bolted or otherwise suitably secured together. The said fire box is provided with an opening 2 in the front thereof through which the gas supply pipe 3 enters said fire box and terminates at a gas reservoir 4 to which are attached the burners 5. Immediately above said burners are disposed a series of narrow water heating and circulating chambers 6, which are as shown, arranged in vertical series, and are secured together by long bolts or rods 7 which pass through orifices formed in the lugs 8 which project from the sides of said sectional chambers. The upper and lower end of said chambers 6 are provided with extensions 9 and 10, respectively, which constitute a continuous flange at the bottom and top of the assembled chambers 6, and are adapted to be seated in, respectively, a corresponding flange 11 formed in the upper edge of the fire box 1 and in the lower edge of the cap 12 screws being employed to secure said cap upon said chambers as shown in Fig. 2. This construction enables the assembling of the sectional chambers, the fire box and cap and produces at the points where said chambers are seated upon the fire box and the cap is seated upon the upper end of the chambers an exceedingly efficient joint without the use of gaskets or packing.

The cap is provided with an annular nipple 13 which is adapted to enter the opening or lower end of the exit flue pipe 14. Immediately below the said exit flue and above the said series of water heating chambers and within the cap 12 is located a draft distributer 15, the function or purpose of which is to uniformly distribute the draft effect of the flue upon the combustion conduits 16 which are formed between said several chambers 6 by means of the laterally projecting flanges 17 at the ends of said chambers whereby the products of combustion and the heat therefrom is uniformly distributed upon the said several water heating chambers.

The construction of said distributer with the diagonally disposed and intersecting ribs 15$^a$ upon its faces is such that the draft of the exit flue 14 is distributed by means of said distributer at four points. In other words, the draft cannot be concentrated upon any portion of the assembled chambers, but is compelled to travel upward through the conduits 16 and impinge upon the plate 15 and pass around the four edges thereof to the exit flue 14.

By reference to Fig. 4, it will be seen that the intersecting diagonal ribs 15$^a$ project upwardly and downwardly from the distributer plate 15 so as to engage the top of the water chambers and the interior of the cap 12 and support the distributer plate in proper position as well as divide the products of combustion and cause them to pass around the four edges of the distributer plate before reaching the outlet 13 at the top of the cap.

Water is admitted to said heater at a point therein at the lowest temperature, *i. e.*, at the bottom of the said several chambers through the water supply pipe 18 which is connected to branch pipes 19 and 20 which extend laterally and downwardly therefrom to, respectively, the pipes 21 and 22, which extend lengthwise the heater on opposite sides thereof. Branch pipes 23 extend from the water supply pipe 21 and enter alternate chambers at the bottom thereof for the purpose of discharging water to be heated therein. The said several chambers 6 are provided with baffles 30 which cause the water to travel in a circuitous path from the bottoms of the chambers to the tops thereof at the opposite side as shown in Fig. 4.

Branch pipes 23 lead from the opposite water supply pipe 21 to the bottoms of those chambers 6 which alternate with the previously mentioned chambers 6 in communication with the branch pipes 24. It will thus be obvious that the branch pipes 23 and 24 are arranged upon opposite sides of the heater, alternate chambers 6 communicating respectively with the pipes 23 and 24. At the top of the heater are disposed the longitudinal discharge pipes 26 and 27, the said discharge pipes being located upon opposite sides of the heater and communicating through branches with the main discharge pipe 25. The discharge pipe 26 is located upon the opposite side of the heater to the supply pipe 21, while the discharge pipe 27 is located upon the opposite side of the heater to the supply pipe 22, and branches 28 lead from the upper portions of those chambers 6 which communicate with the supply pipe 21 to the discharge pipe 26, while branch pipes 29 on the opposite side of the heater lead from the upper portions of the remaining chambers 6 to the other discharge pipe 27, the lower portions of the said chambers communicating through the branches 24 with the water supply pipe 22. It will thus be obvious that the water will circulate upwardly in a diagonal direction through the various water chambers, although the diagonal direction of circulation will be different in adjacent water chambers.

One of the principal advantages of the construction above described is that by bringing the water into every alternate vertically disposed chamber from opposite sides it enables the assemblage of water heating chambers comparatively as narrow as the diameter of the water supply pipes entering therein and at the same time enables the adjusting of the said several chambers to any given number. In other words, any one of the chambers may be removed and yet a sufficient space would be left between each of the supply pipes, to enable the same to be readily attached and removed.

Another very important advantage is that the narrowness or the shallowness of the vertically disposed chambers presents to the action of the products of combustion very shallow sheets of water which are, as a matter of course, more readily heated to a high degree of temperature than a deeper or larger column of water.

Having described my invention what I claim and desire to secure by Letters Patent is—

1. A water heater including a series of independent flat upright water chambers arranged side by side in a spaced relation to provide combustion conduits between adjacent water chambers, a water supply pipe extending along each side of the water chambers, branch pipes leading from each of the water supply pipes to alternate water chambers so that successive water chambers communicate alternately with the supply pipes on opposite sides thereof, discharge pipes extending along opposite sides of the water chambers, branch pipes leading from the discharge pipes to alternate water chambers so that the water circulates diagonally through the different water chambers, a combustion chamber arranged under the water chambers, a cap arranged over the water chambers and formed with an exit for the products of combustion, and a horizontally disposed distributer plate arranged within the cap between the before mentioned combustion conduits and the exit for the products of combustion, so that the products of combustion will be divided and pass around the edges of the distributer plate after impinging against the same.

2. A water heater including a series of independent flat upright water chambers arranged side by side in a spaced relation to provide combustion conduits between adjacent water chambers, supply and discharge pipes communicating with the water chambers for permitting water to circulate through the same, a combustion chamber arranged under the water chambers, a cap arranged over the water chambers and formed with an exit for the products of combustion, a horizontally disposed distributer plate arranged within the cap between the before mentioned combustion conduits and the exit for the products of combustion, and diagonally disposed and intersecting ribs projecting downwardly from the distributer plate so as to rest upon the water chambers and support the distributer plate above the same, said intersecting ribs causing the products of combustion to be divided and pass around the four edges of the distributer plate after impinging against the distributer plate.

3. A water heater including a series of independent flat upright water chambers arranged side by side in a spaced relation to provide combustion conduits between adjacent water chambers, a water supply pipe extending along each side of the water chambers, branch pipes leading from each of the water pipes to alternate water chambers so that successive water chambers communicate alternately with the supply pipes on opposite sides thereof, discharge pipes extending along opposite sides of the water chambers, branch pipes leading from the discharge pipes to alternate water chambers so that the water circulates diagonally through the different water chambers, a combustion chamber arranged under the water chambers, and a cap arranged over the water chambers and formed with an exit for the products of combustion.

4. A water heater including a series of independent flat upright water chambers arranged side by side and provided at their upright edges with outwardly projecting lugs and laterally projecting flanges, the said flanges being adapted to coöperate with each other to hold the water chambers in a spaced relation and provide combustion conduits between adjacent water chambers, the top and bottom of the assembled water chambers being also formed with flanges at the edges thereof, bolts engaging the lugs to hold the water chambers in position, a combustion chamber arranged under the water chambers and engaging the bottom flange thereof, a cap arranged over the water chambers and engaging the top flange thereof, the said cap being formed with an exit for the products of combustion, water supply pipes extending transversely along opposite edges of the water chambers, branch pipes leading from the water supply pipes to alternate water chambers so that the successive water chambers communicate alternately with the supply pipes on opposite sides thereof, a pair of discharge pipes extending transversely along opposite sides of the water chambers, and branch pipes leading from each of the discharge pipes to alternate water chambers so that the water is adapted to circulate diagonally through the different water chambers.

5. A water heater including a series of independent flat upright water chambers arranged side by side in a spaced relation to provide combustion conduits between adjacent water chambers, supply and discharge pipes communicating with the water chambers for permitting water to circulate through the same, a combustion chamber arranged under the water chambers, a hollow cap applied to the top of the water chambers and provided with a central opening in the top thereof for the escape of the products of combustion, a horizontally disposed distributer plate arranged within the cap, and diagonally disposed intersecting ribs projecting upwardly and downwardly from the distributer plate and engaging the top of the water chambers and the walls of the cap so as to support the distributer plate in position within the cap and cause the products of combustion to be divided and pass around the edges of the distributer plate before reaching the opening in the top of the cap.

In testimony whereof, I have hereunto signed my name in the presence of two subscribing witnesses.

JOHN C. BECKFIELD.

In the presence of—
CLARENCE A. WILLIAMS,
MAE KEPPLE.